(12) United States Patent
Cambron

(10) Patent No.: US 11,396,132 B2
(45) Date of Patent: Jul. 26, 2022

(54) SYSTEM AND METHOD FOR A QUICK-CHANGE MATERIAL TURRET IN A ROBOTIC FABRICATION AND ASSEMBLY PLATFORM

(71) Applicant: Advanced Solutions Life Sciences, LLC, Louisville, KY (US)

(72) Inventor: Scott Douglas Cambron, Louisville, KY (US)

(73) Assignee: ADVANCED SOLUTIONS LIFE SCIENCES, LLC, Louisville, KY (US)

( * ) Notice: Subject to any disclaimer, the term of this patent is extended or adjusted under 35 U.S.C. 154(b) by 73 days.

(21) Appl. No.: 17/101,097

(22) Filed: Nov. 23, 2020

(65) Prior Publication Data

US 2021/0069974 A1 Mar. 11, 2021

Related U.S. Application Data

(62) Division of application No. 15/726,617, filed on Oct. 6, 2017, now Pat. No. 10,875,243.

(Continued)

(51) Int. Cl.
*B29C 64/209* (2017.01)
*B29C 64/106* (2017.01)
(Continued)

(52) U.S. Cl.
CPC .......... *B29C 64/209* (2017.08); *B29C 64/106* (2017.08); *B29C 64/112* (2017.08);
(Continued)

(58) Field of Classification Search
CPC ... B29C 64/209; B29C 64/112; B29C 64/232; B29C 64/245; B29C 64/393;
(Continued)

(56) References Cited

U.S. PATENT DOCUMENTS

2004/0188546 A1 9/2004 Tabata et al.
2014/0265034 A1 9/2014 Dudley
(Continued)

FOREIGN PATENT DOCUMENTS

CN 103932367 A 7/2014

OTHER PUBLICATIONS

Machine Translation (English) of CN 1039232367A.
International Search Report and Written Opinion for corresponding PCT App. PCT/US17/55483 dated Dec. 11, 2017.

*Primary Examiner* — Larry W Thrower
(74) *Attorney, Agent, or Firm* — Dinsmore & Shohl LLP

(57) ABSTRACT

Systems and methods for a robotic fabrication and assembly platform providing a plurality of printable materials for fabrication of a three-dimensional object are provided. A method includes activating a pneumatic actuator to extend a quick-change turret from a pneumatic seal. The method may insert a plurality of barrels into the quick-change turret. The method may also align one of the plurality of barrels with a pneumatic seal in the quick-change turret. The method may also disengage the pneumatic actuator to seat the aligned barrel onto the pneumatic seal and print a three-dimensional object. The method may further halt the printing of the three-dimensional object prior to completion and engage the pneumatic actuator to extend the quick-change turret from the pneumatic seal.

16 Claims, 16 Drawing Sheets

Related U.S. Application Data

(60) Provisional application No. 62/405,281, filed on Oct. 7, 2016.

(51) Int. Cl.
    *B33Y 10/00*      (2015.01)
    *B33Y 30/00*      (2015.01)
    *B33Y 50/02*      (2015.01)
    *B29C 64/112*      (2017.01)
    *B29C 64/232*      (2017.01)
    *B29C 64/245*      (2017.01)
    *B29C 64/393*      (2017.01)
    *B29C 64/236*      (2017.01)
    *B29C 64/241*      (2017.01)

(52) U.S. Cl.
    CPC .......... *B29C 64/232* (2017.08); *B29C 64/236* (2017.08); *B29C 64/241* (2017.08); *B29C 64/245* (2017.08); *B29C 64/393* (2017.08); *B33Y 10/00* (2014.12); *B33Y 30/00* (2014.12); *B33Y 50/02* (2014.12); *Y10S 901/30* (2013.01)

(58) Field of Classification Search
    CPC ... B29C 64/236; B29C 64/241; B29C 64/106; B33Y 10/00; B33Y 30/00; B33Y 50/02; Y10S 901/30
    See application file for complete search history.

(56) References Cited

U.S. PATENT DOCUMENTS

2015/0251360 A1    9/2015   Steele
2015/0375457 A1   12/2015   Mark et al.

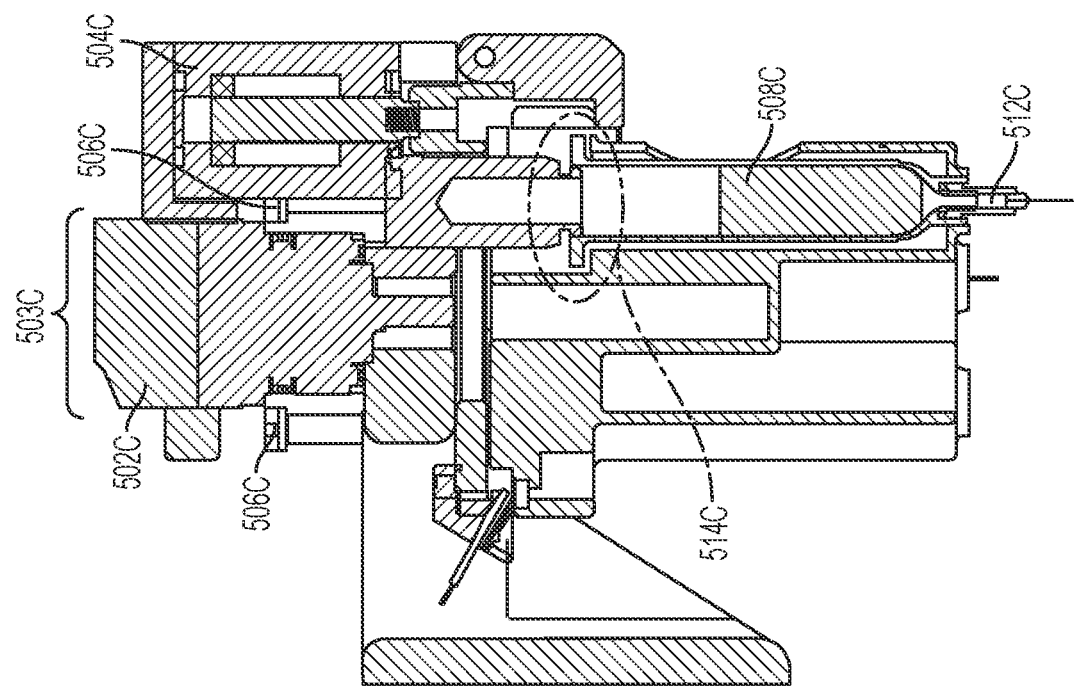

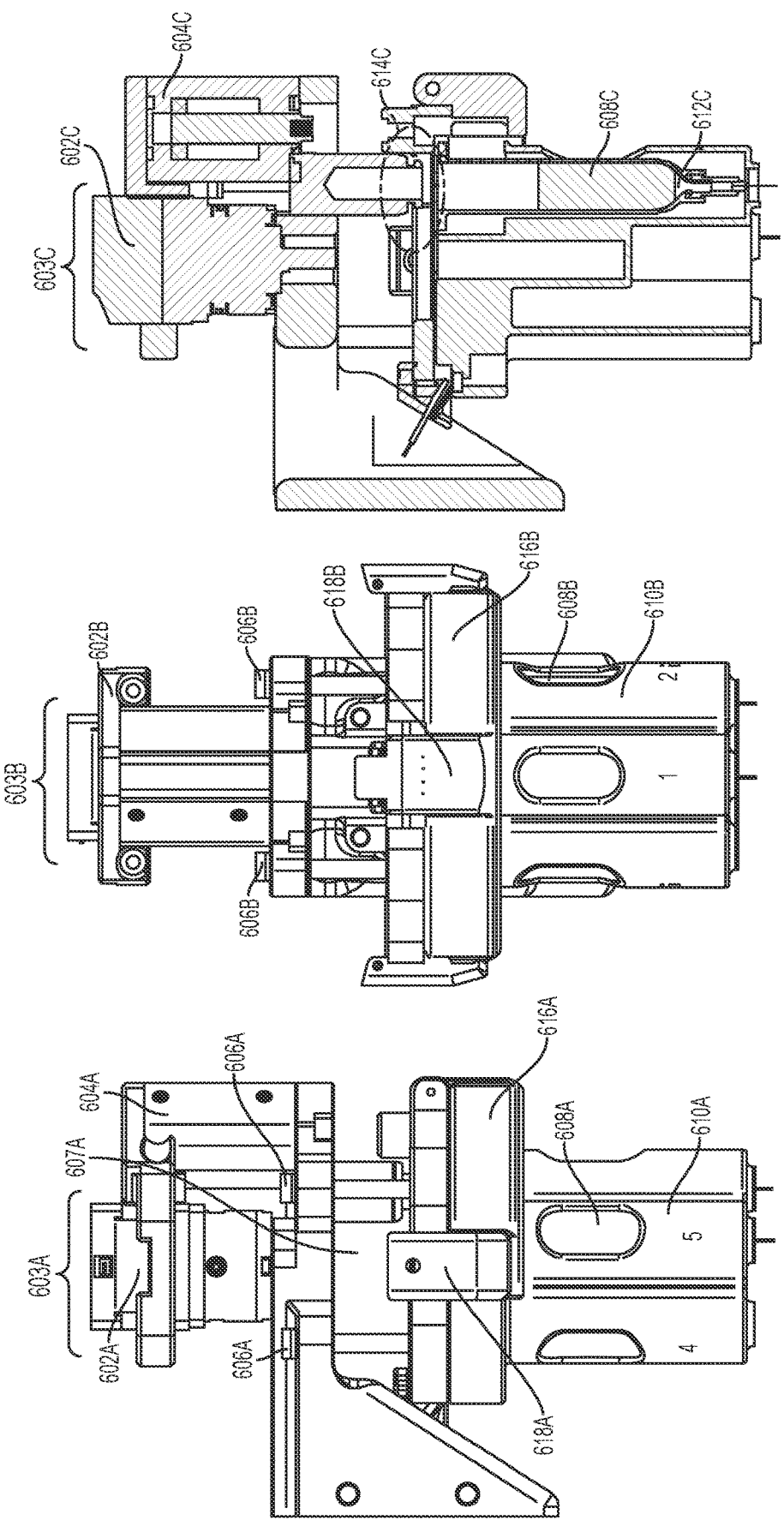

SYSTEM AND METHOD FOR A QUICK-CHANGE MATERIAL TURRET IN A ROBOTIC FABRICATION AND ASSEMBLY PLATFORM

CROSS-REFERENCE TO RELATED APPLICATIONS

This application is a division of U.S. application Ser. No. 15/726,617, filed Oct. 6, 2017, which claims the benefit of U.S. Provisional Application Ser. No. 62/405,281, filed Oct. 7, 2016, each of which is incorporated by reference in its entirety.

TECHNICAL FIELD

The present application generally relates to robotic fabrication and assembly platforms and, more particularly, to systems and methods for utilizing a benchtop/portable robotic fabrication and assembly platform to dispense a variety of materials.

BACKGROUND

Additive manufacturing, also known as three-dimensional printing provides a way to fabricate three-dimensional objects that has gained prevalence in recent years. Dispensation mechanisms of printable materials used in the fabrication of three-dimensional objects have included pneumatic, mechanical, jetting, electrospinning, fused deposition modeling mechanisms, etc. Three-dimensional objects have traditionally been stored and printed using Cartesian coordinates (XYZ). Additionally, changing between different printable materials to fabricate a 3D object has involved 3D printers that lack portability as well as the ability to quickly switch between those printable materials.

Accordingly, a need exists for systems that provide a portable robotic fabrication and assembly platform able to quickly switch between printable materials during 3D object fabrication utilizing non-traditional coordinate systems, along with methods of use of such systems.

SUMMARY

A robotic fabrication and assembly platform for providing a plurality of printable materials for fabrication of a three-dimensional object may comprise a power supply configured to provide power to a horizontal motor assembly, a vertical motor assembly, an angular motor assembly, and a turret motor. The robotic fabrication and assembly platform may further comprise the horizontal motor assembly configured to horizontally move a rotatable build platen. The robotic fabrication and assembly platform may also comprise the vertical motor assembly configured to vertically move a quick-change turret. The robotic fabrication and assembly platform may additionally comprise the angular motor assembly configured to rotate the rotatable build platen. The robotic fabrication and assembly platform may also comprise the quick-change turret comprising the turret motor configured to move an indexed motor spindle. The quick-change turret may further comprise a print head configured for switching between printable materials among a plurality of barrels. The quick-change turret may further still comprise a pneumatic seal configured for delivering a selected printable material from within a barrel among the plurality of barrels. The quick-change turret may additionally comprise the indexed motor spindle configured to rotate the quick-change turret and the plurality of barrels. The quick-change turret may also additionally comprise a pneumatic actuator configured to extend the quick-change turret such that a pneumatic seal varies between an open state and a closed state. The robotic fabrication and assembly platform may still further comprise the rotatable build platen configured to rotate parallel to the quick-change turret.

In another embodiment, a method for providing a plurality of printable materials to a robotic fabrication and assembly platform for fabrication of an object may comprise activating a pneumatic actuator to extend a quick-change turret from a pneumatic seal. The method may also comprise inserting a plurality of barrels into the quick-change turret. The method may further comprise aligning one of the plurality of barrels with a pneumatic seal in the quick-change turret. The method may further still comprise disengaging the pneumatic actuator to seat the aligned barrel onto the pneumatic seal. The method may additionally comprise printing a three-dimensional object. The method may further additionally comprise halting the printing of the three-dimensional object prior to completion. The method may still additionally comprise also further comprise engaging the pneumatic actuator to extend the quick-change turret from the pneumatic seal. The method may also comprise selecting another printable material from the plurality of printable materials by rotating the quick-change turret via a turret motor to print in sequence another printable material of the plurality of printable materials. The method may further comprise disengaging the pneumatic actuator to seat another of the plurality of barrels onto the pneumatic seal. The method may still further comprise resuming printing of the three-dimensional object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5C illustrates a cross-sectional side view of a quick-change turret utilizing latches and with alignment pins in an up position, according to one or more embodiments shown and described herein;

FIG. 6A illustrates a side view of a quick-change turret utilizing latches and with alignment pins in a down position, according to one or more embodiments shown and described herein;

FIG. 6B illustrates a frontal view of a quick-change turret utilizing latches and with alignment pins in a down position, according to one or more embodiments shown and described herein;

FIG. 6C illustrates a cross-sectional side view of a quick-change turret utilizing latches and with alignment pins in a down position, according to one or more embodiments shown and described herein;

DETAILED DESCRIPTION

Figure 1A:
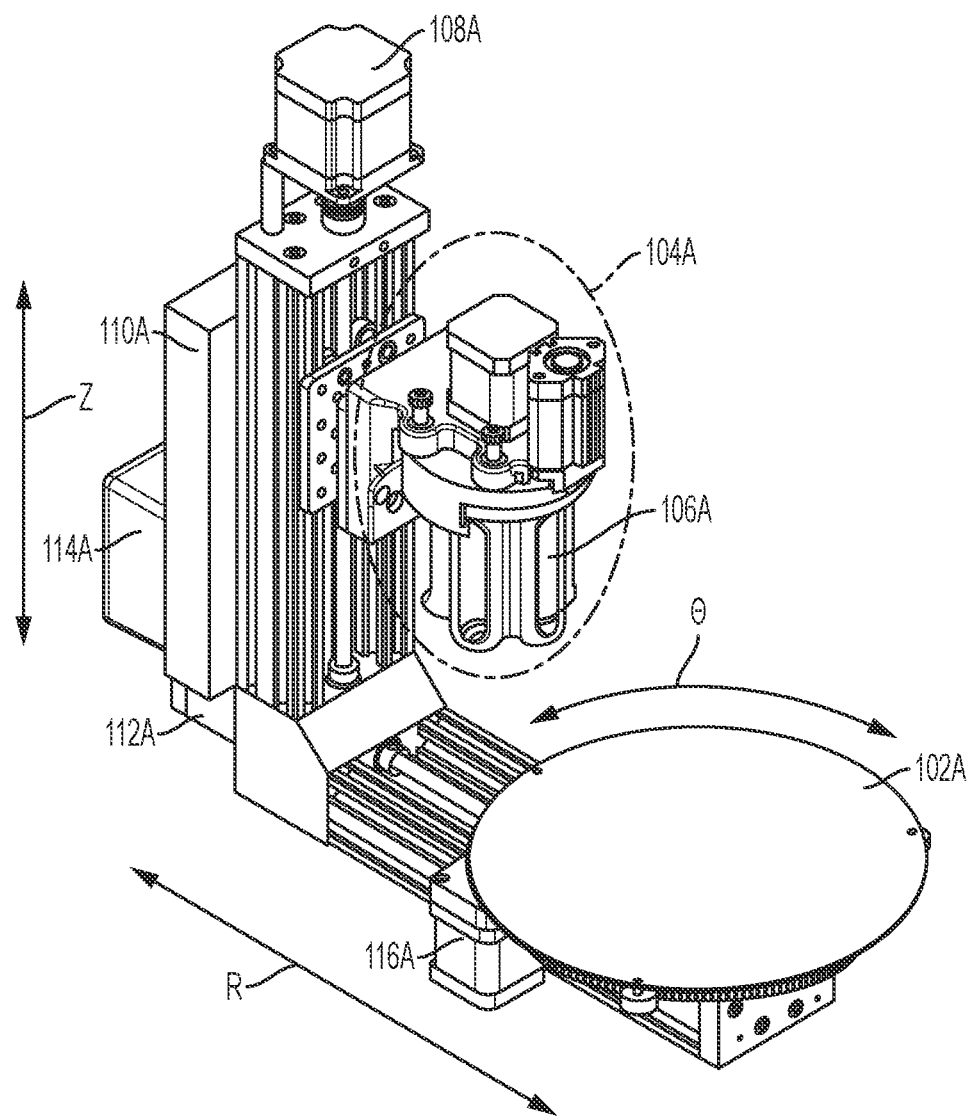
FIG. 1A illustrates a perspective view of a robotic fabrication and assembly platform, according to one or more embodiments shown and described herein.

Referring to FIG. 1A, a perspective view of a robotic fabrication and assembly platform is depicted, through which embodiments of the disclosure can be implemented. The robotic fabrication and assembly platform may include a rotatable build platen 102A that may be rotated by an angular motor assembly 116A at any suitable speed and/or in any suitable angular direction, either or both of which may be determined and/or adjusted by the robotic fabrication and assembly platform and/or a user. In this embodiment the angular motor assembly 116A is located below an outer portion of the rotatable build platen 102A, although the angular motor assembly 116A may be located anywhere suitable for controlling rotation of the rotatable build platen 102A. In various embodiments, any suitable number of angular motor assemblies may be utilized. In this embodiment the rotatable build platen 102A rotates about an axis $\Theta$ orthogonal to the center of the rotatable build platen 102A, although any suitable axis of rotation may be utilized. In some embodiments, the rotatable build platen 102A may utilize a gear drive (or any other suitable mechanism(s) to achieve rotation) and/or may allow for temperature modification, such as for heating and/or cooling the temperature of which may be determined and/or adjusted by the robotic fabrication and assembly platform and/or a user. For example, heating or cooling may be used to impact the rate at which printed material deposited upon the rotatable build platen 102A stays in its current form (such as remaining viscous due to heat) or changes (such as hardening due to cooling).

In some embodiments, the quick-change turret 104A may print according to received cylindrical coordinates comprising $R\Theta Z$ coordinate values, where R is a horizontal coordinate value, $\Theta$ is a rotational axis coordinate value (measured in radians, degrees, etc.), and Z is a vertical coordinate value. In this embodiment, a three-dimensional object may be printed according to cylindrical coordinate values comprising $R\Theta Z$, wherein R represents a horizontal coordinate value, $\Theta$ represents a rotational axis coordinate value, and Z represents a vertical coordinate value. Other embodiments may utilize Cartesian coordinates or any other suitable representation of a three-dimensional object. In this embodiment, $\Theta$ may correspond to the rotation of the rotatable build platen 102A.

In this embodiment, the rotatable build platen 102A may also be moved horizontally by a horizontal motor assembly 112A that moves the rotatable build platen 102A horizontally towards and away the from horizontal motor assembly 112A along the R (horizontal) axis at any suitable speed along the R (horizontal) axis, which may be determined and/or adjusted by the robotic fabrication and assembly platform and/or a user. In some embodiments the horizontal motor assembly 112A may utilize a screw drive, although any suitable mechanism(s) may be utilized. In various embodiments, any suitable number of horizontal motor assemblies may be utilized. In other embodiments the horizontal motor assembly 112A may move the rotatable build platen 102A in a direction that is not purely horizontal, such as at a gradient. In this example, a vertical motor assembly 108A may be utilized to vertically move a quick-change turret 104A along the Z (vertical) axis. In some embodiments, the vertical motor assembly 108A may utilize a screw drive, although any suitable mechanism(s) may be utilized. In some embodiments the vertical motor assembly 108A may move the quick-change turret 104A orthogonally with respect to the rotatable build platen 102A at any suitable and/or adjustable speed and/or angle which may be determined and/or adjusted by the robotic fabrication and assembly platform and/or a user. In other embodiments the vertical motor assembly 108A may move the quick-change turret 104A in a direction that is not purely vertical, such as at a gradient.

In this embodiment, a motor controller 114A may be utilized to control the vertical motor assembly 108A, the horizontal motor assembly 112A, the angular motor assembly 116A, and/or the quick-change turret 104A. Any suitable type of motor assemblies may be used for any of these components utilizing any suitable type of power such as electric power, hydraulic, pneumatic, etc. A power supply 110A may be located between the vertical motor assembly 108A and motor controller 114A. In other embodiments, one or more power supplies may be located anywhere on the robotic fabrication and assembly platform. External power, whether delivered via wire or wireless, may also be utilized in some embodiments. Communication between any of the motor controller 114A, the vertical motor assembly 108A, the horizontal motor assembly 112A, the angular motor assembly 116A, the quick-change turret 104A, and/or the power supply 110A may utilize any suitable wired and/or wireless protocols to transmit power, data, and/or instructions. As discussed in more detail below, the quick-change turret 104A may feature one or more barrels 106A utilized to store and provide printable material. In some embodiments, the rotatable build platen 102A may be configured to rotate parallel to the quick-change turret 104A.

In this embodiment, unobstructed airflow may be permitted directly onto the rotatable build platen 102A. This may, for example, assist with cooling a freshly-printed three dimensional object. Moreover, the robotic fabrication and assembly platform may be open to provide certain airflow characteristics. In this embodiment this open form factor may reduce potential turbulence when placed in a sterile biohood, as air turbulence generates flow eddies that reduce/deter sterility in a biohood. Put another way, this may reduce air turbulence by providing a path for unobstructed airflow from a height above the robotic fabrication and assembly platform onto the rotatable build platen.

Additionally, a three-dimensional scanner may be utilized in some embodiments. Any suitable type of data may be captured utilizing any suitable 3D scanning technique. This may occur, for example, by a scanner positioned near the rotatable build platen 102A to scan an object as it sits upon the rotatable build platen 102A and rotates. In other examples, a scanner descending from the quick-change turret 104A to rotate about an object resting upon the rotatable build platen 102A, which may rotate to give the 3D scanner a full rotational view of the object.

Figure 1B:
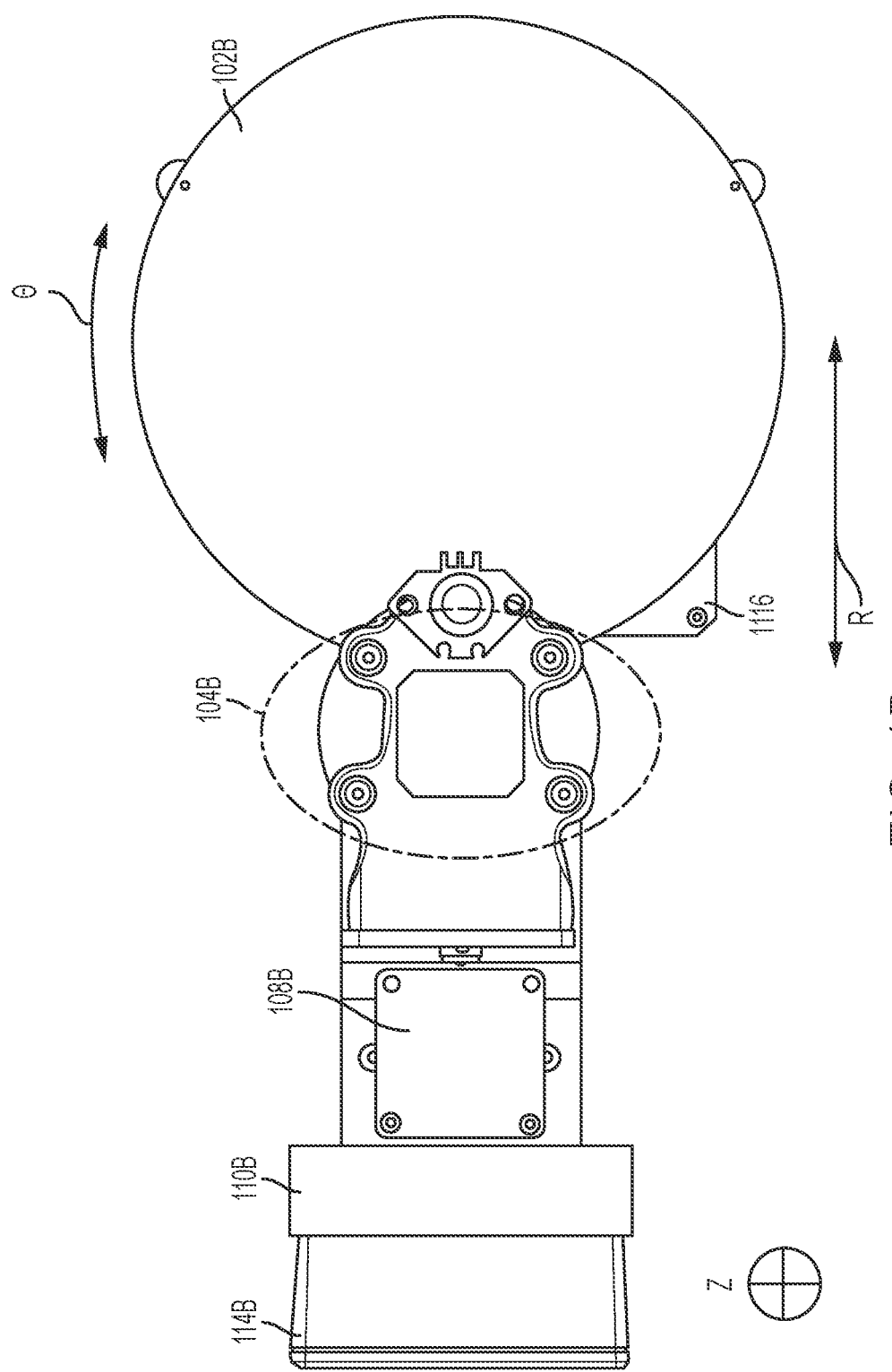
FIG. 1B illustrates a top-down view of a robotic fabrication and assembly platform, according to one or more embodiments shown and described herein.

Turning now to FIG. 1B, a top-down view of a robotic fabrication and assembly platform is shown according to various embodiments. As depicted in FIG. 1A, the motor controller 114B may be coupled to the power supply 110B, which may itself be coupled to the vertical motor assembly 108B. The quick-change turret 104B may be coupled to components controlled by the vertical motor assembly 108B located above a portion of the rotatable build platen 102B.

Figure 2C:
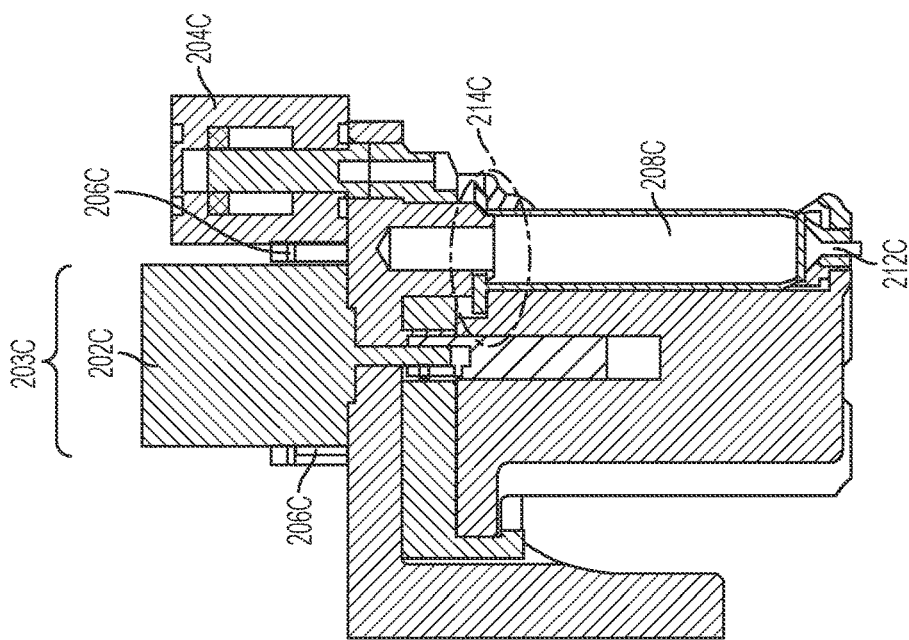
FIG. 2C illustrates a cross-sectional side view of a quick-change turret with alignment pins in an up position, according to one or more embodiments shown and described herein.
Figure 2B:
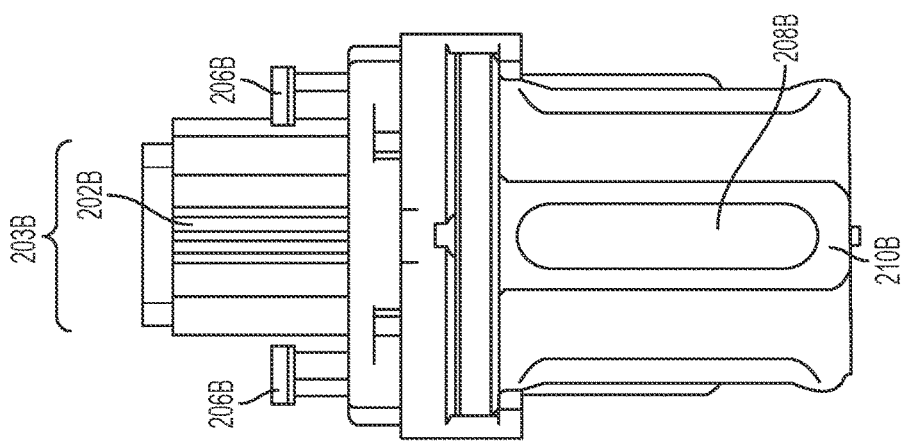
FIG. 2B illustrates a frontal view of a quick-change turret with alignment pins in an up position, according to one or more embodiments shown and described herein.
Figure 2A:
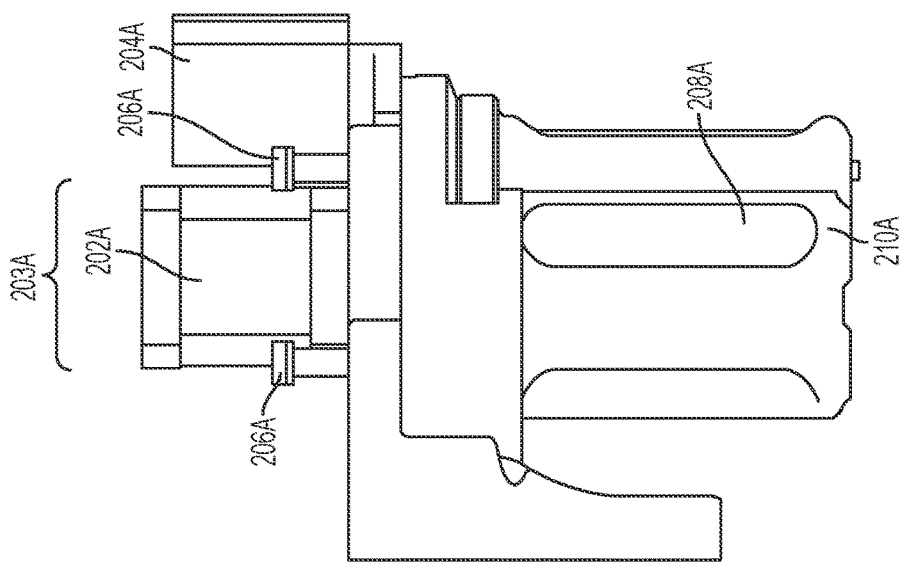
FIG. 2A illustrates a side view of a quick-change turret with alignment pins in an up position, according to one or more embodiments shown and described herein.

Turning now to FIG. 2A, a side view of a quick-change turret with alignment pins in an up position is shown according to various embodiments. In this embodiment, a turret motor 202A located within a turret 203A at the top of the quick-change turret, in combination with a pneumatic actuator 204A, may provide rotational motion to the quick-change turret. Alignment pins 206A, shown here in a closed position, may prevent misalignment and binding of the moving components of the printhead during actuation. For example, the alignment pins 206A may align one of the plurality of barrels with a pneumatic seal. Each barrel 210A may contain a printable material 208A to be expelled via a needle, although any suitable type of delivery opening may be utilized to expel printable material 208A from the barrel 210A. Barrels 210A in this embodiment are uniform (size, length, shape, material(s) of which the barrels are made, etc.) but need not be in other embodiments. By way of non-limiting example, 3, 5, 10, and/or 30 cc barrel turret designs may utilized, although any suitable design and/or size may be utilized.

A barrel 210A may have a window (transparent, translucent, tinted, shaded, etc.) to view the printable material 208A, whereas other embodiments may have a display (digital, etc.) to indicate how much printable material 208A remains in the barrel 210A. In various embodiments, at least two of the barrels 210A each contain a different printable material 208A, which may be any suitable type of material, such as, by way of non-limiting examples, collagen, fibrin, hydrogels, solvated biocompatible materials such as polyactic acid (PLA), poly(lactide-co-glycolide) (PLGA), poly (glycolic acid) PGA, pastes, etc. In some embodiments, when barrels 210A are placed in the turret 203A may be seated against a compression spring in the bottom of the turret 203A. This spring may bias the barrel 210A to be seated (for example) near the top of the turret, and in this embodiment when the particular barrel 210A is placed and seated on the pneumatic seal (shown in 214C in FIG. 2C), the spring may be compressed, forcing the tip of the printing needle to be lower (8 mm for example, or any other suitable value) than all other needle tips in the turret 203A. In various embodiments, different barrels 210A may have different visible needle lengths extending out of each barrel 210A. In some embodiments, a barrel stroke size may be modifiable, such that changing the barrel stroke size may allow for the accommodation of various well plate sizes. In some embodiments, a pneumatic actuator 204A with 10 mm of stroke may be employed, although any suitable value may be utilized. For example, an actuator may be employed with a longer stroke value to allow for a larger distance between a needle (or print tip) and banked needles. In some embodiments, the pneumatic actuator stroke may be transitioned to a mechanical actuator.

Turning now to FIG. 2B, a frontal view of a quick-change turret with alignment pins in an up position shown according to various embodiments.

Turning now to FIG. 2C, a cross-sectional side view of a quick-change turret with alignment pins in up position is depicted, through which embodiments of the disclosure can be implemented. Any number of alignment pins 206C may be utilized to align one of a plurality of barrels 210C have needles 212C with a pneumatic seal 214C. In various embodiments, any number of pneumatic seals 214C may be utilized, along with any number of corresponding barrels 210C. In this embodiment, a pneumatic seal 214C may be configured to deliver a selected printable material from within a barrel 210C among the plurality of barrels 210C. The pneumatic actuator 204C may be configured to extend the quick-change turret such that the pneumatic seal 214C varies between an open state and a closed state. In this embodiment, the quick-change turret is closed a needle 212C is ready to provide printable material 208C.

Figure 3C:
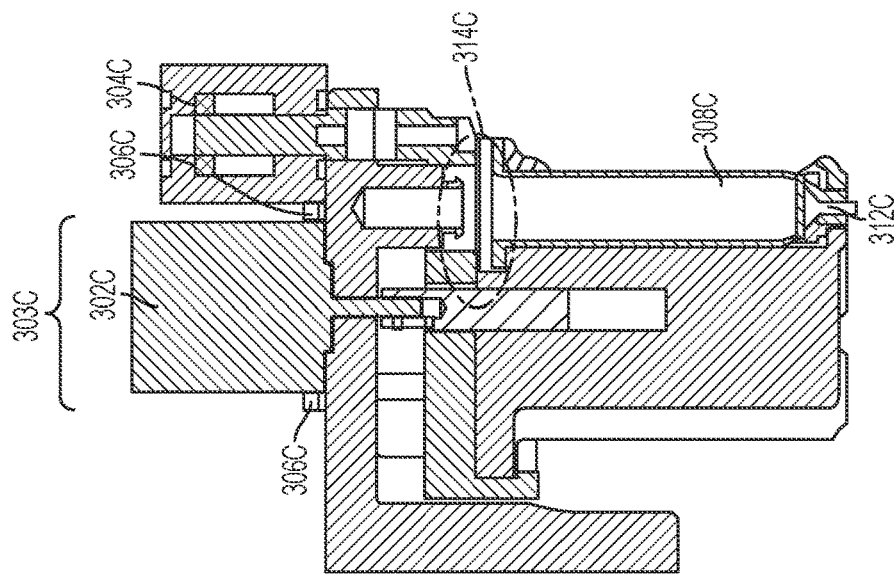
FIG. 3C illustrates a cross-sectional side view of a quick-change turret with alignment pins in a down position, according to one or more embodiments shown and described herein.
Figure 3B:
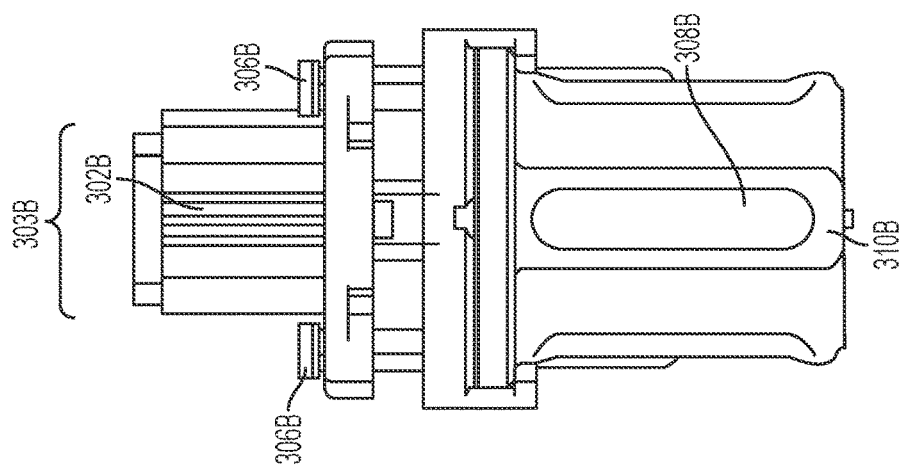
FIG. 3B illustrates a frontal view of a quick-change turret with alignment pins in a down position, according to one or more embodiments shown and described herein.
Figure 3A:
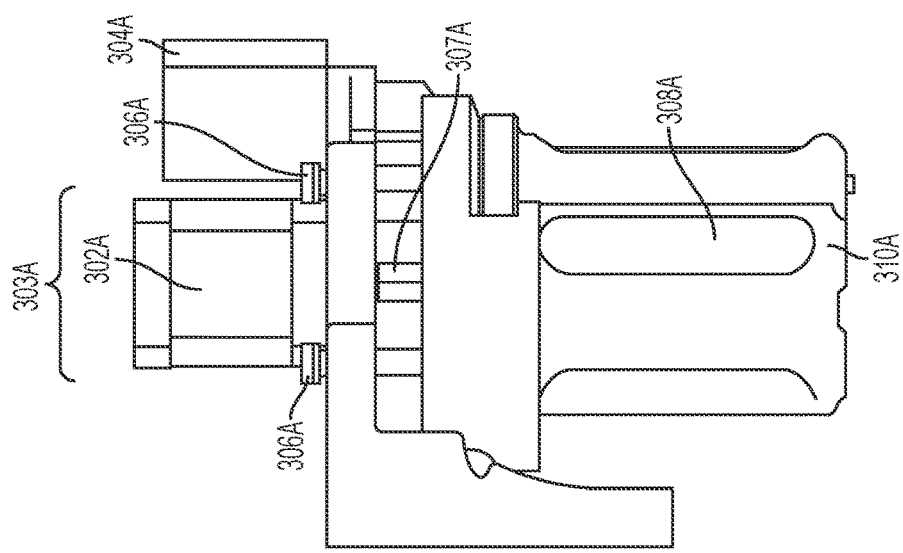
FIG. 3A illustrates a side view of a quick-change turret with alignment pins in a down position, according to one or more embodiments shown and described herein.

Turning now to FIG. 3A, a side view of a quick-change turret with alignment pins in a down position is shown according to various embodiments. Here the turret motor 302A may be located within a turret 303A at the top of the quick-change turret, in combination with a pneumatic actuator 304A. In this example, the alignment pins 306A are in an open state. In this embodiment the turret motor 302A may be configured to move an indexed motor spindle 307A. In this embodiment, the indexed motor spindle 307 may be configured to rotate the quick-change turret and a plurality of barrels 310A which may contain printable material 308A.

Turning now to FIG. 3B, a frontal view of a quick-change turret with alignment pins in a down position is depicted, through which embodiments of the disclosure can be implemented.

Turning now to FIG. 3C, a cross-sectional side view of a quick-change turret with alignment pins in a down position is shown according to various embodiments. In this example a barrel 310C has been aligned with the pneumatic seal 314C, which is open. The alignment pins 306C may prevent misalignment and binding of the moving components of a printhead during actuation. The alignment pins 306C may slide within a bushing to maintain alignment. Other embodiments may utilize linear ball bearings. In this embodiment, the quick-change turret is in an open state, which prevents printing.

Figure 4A:
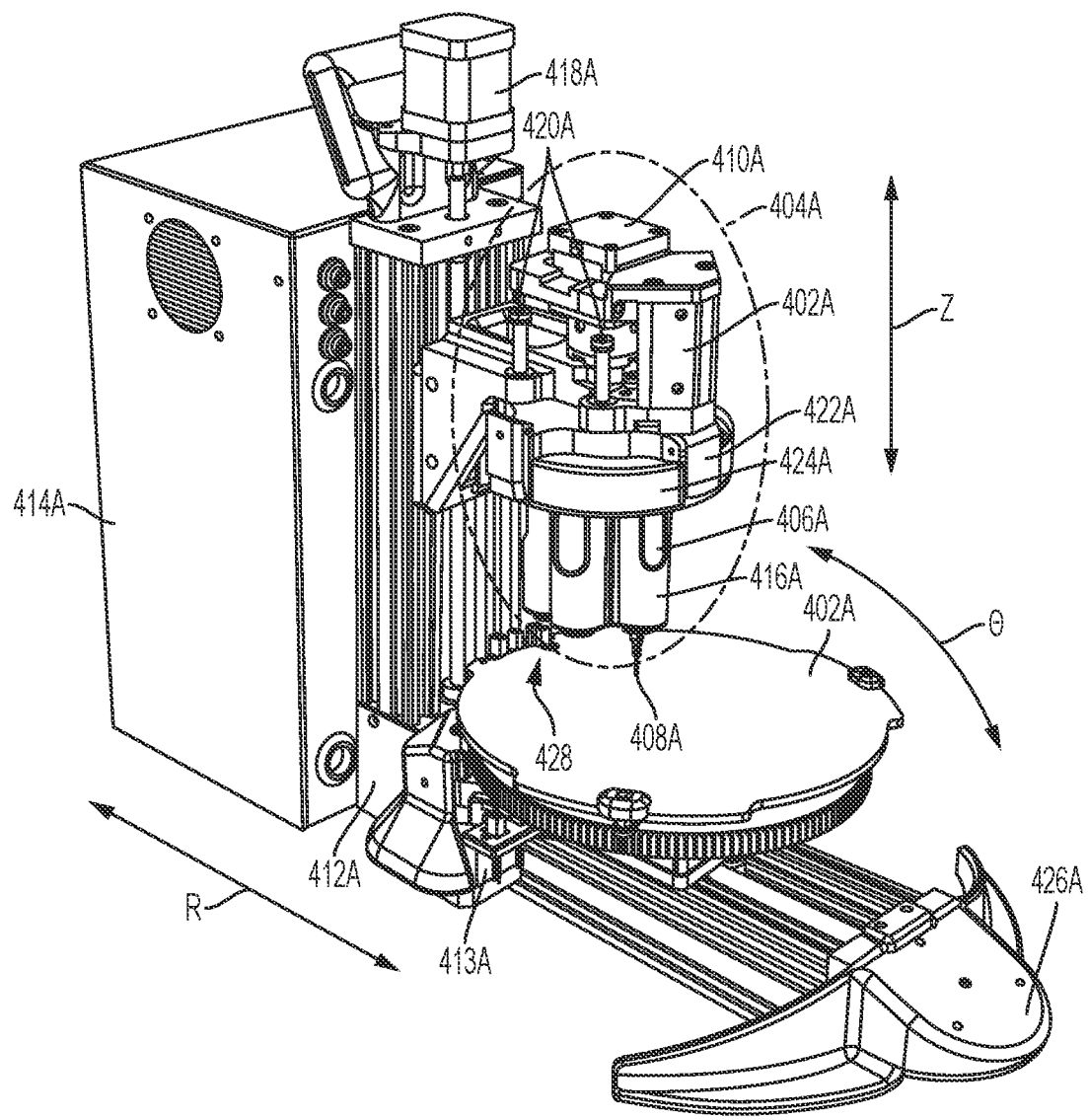
FIG. 4A illustrates a perspective view of a robotic fabrication and assembly platform featuring a handle, enclosure, and front stabilizer, according to one or more embodiments shown and described herein.

Turning now to FIG. 4A, a perspective view of a robotic fabrication and assembly platform featuring a handle, enclosure, and front stabilizer is shown according to various embodiments. In addition to a horizontal motor assembly 412A, a vertical motor assembly 418A, and an angular motor assembly 413A, in this embodiment an enclosure 414A may be utilized to house various components described herein, such as a power supply, which in some embodiments may improve serviceability, improve the manufacturability, and provide cable refactoring. In some embodiments, the quick-change turret 404A may be configured to change between printable materials 416A without programmatically compensating for static spans between needle 408A tips on the plurality of barrels 406A on the print head. The quick-change turret 404A may be configured to provide heating or cooling is some examples. A fused deposition modeling head may be utilized as an additional print head within and/or adjacent to the quick-change turret 404A. In some embodiments, barrels 406A may be sequentially aligned with the pneumatic seal. In some embodiments, a front stabilizer 426A may provide stability for the robotic fabrication and assembly platform and/or operation of the rotatable build platen 402A. In this embodiment, the quick-change turret 404A may include, by way of example, a turret 410A, alignment pins 420A, a turret carriage assembly 424A, and one or more latches 422A (or clamps) for removal and insertion of, for example, the turret carriage assembly 424A. Other embodiments may utilize screws (such as thumb screws) instead of latches 422A, or a combination thereof.

Figure 4B:
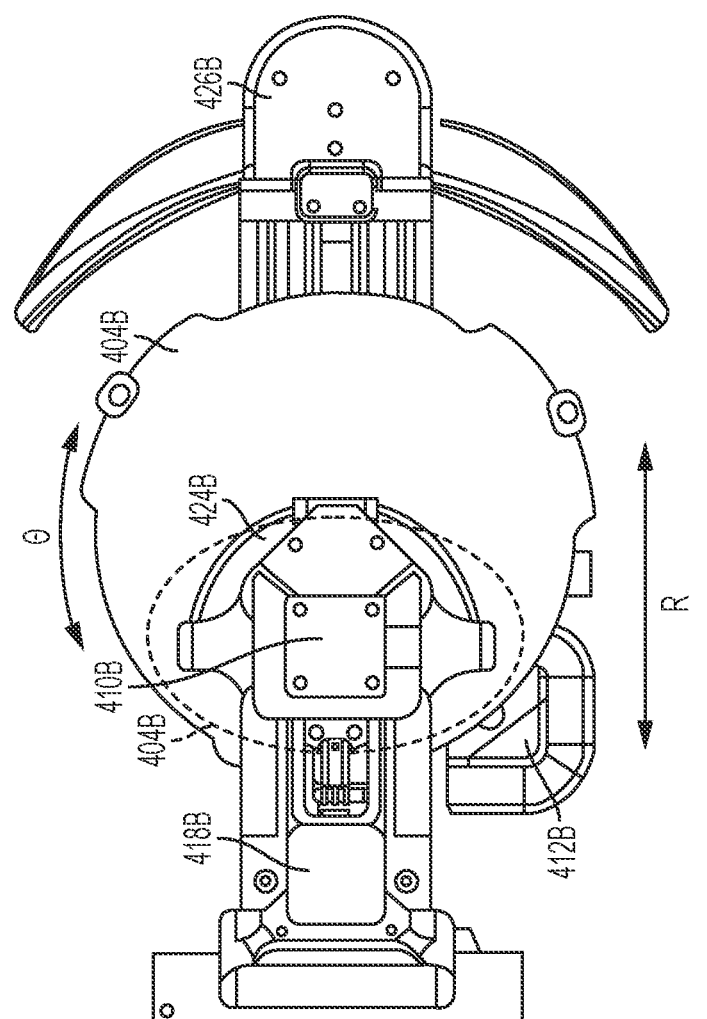
FIG. 4B illustrates a top-down view of a robotic fabrication and assembly platform featuring a handle, enclosure, and front stabilizer, according to one or more embodiments shown and described herein.

Turning now to FIG. 4B, a top-down view of a robotic fabrication and assembly platform featuring a handle, enclosure, and front stabilizer is shown according to various embodiments.

Figure 5B:
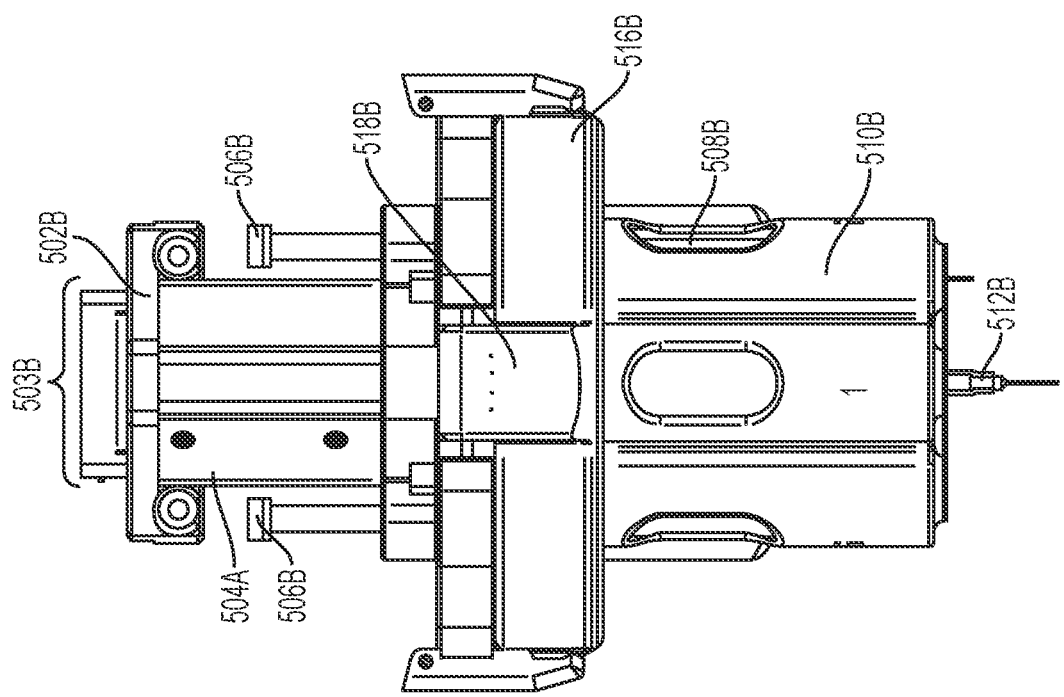
FIG. 5B illustrates a frontal view of a quick-change turret utilizing latches and with alignment pins in an up position, according to one or more embodiments shown and described herein.
Figure 5A:
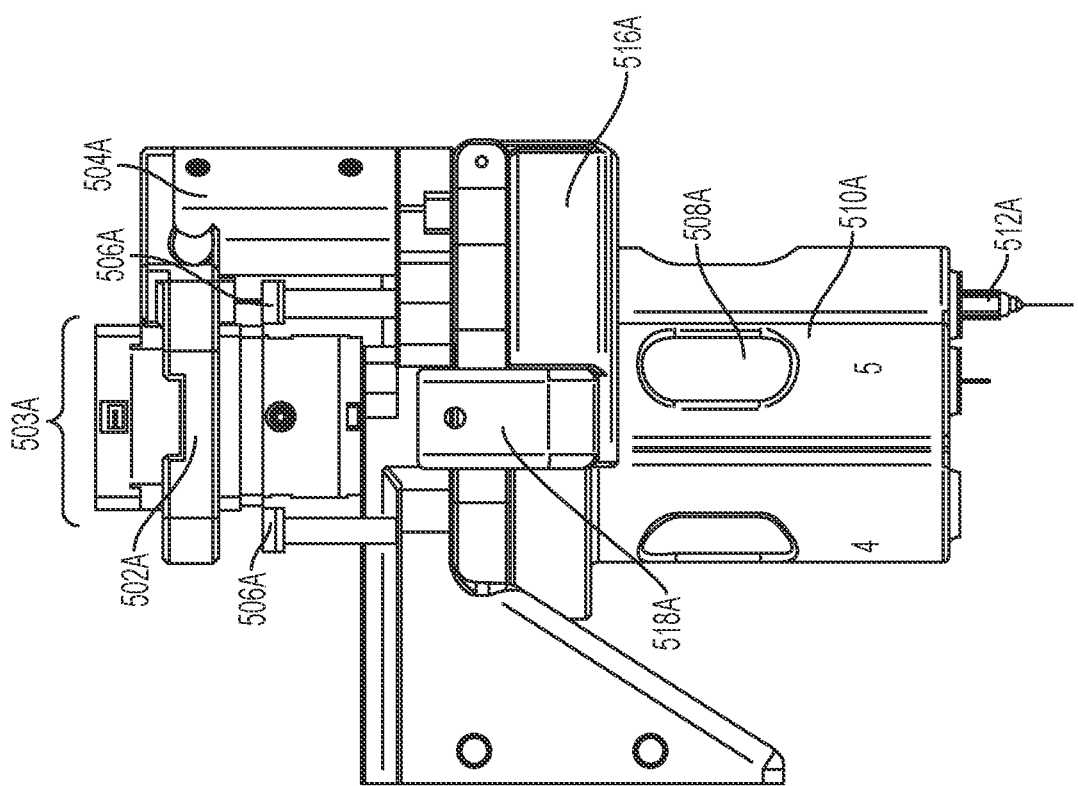
FIG. 5A illustrates a side view of a quick-change turret utilizing latches and with alignment pins in an up position, according to one or more embodiments shown and described herein.

Turning now to FIG. 5A, a side view of a closed quick-change turret utilizing latches and with alignment pins positioned up with the quick-change turret in a closed position is shown according to various embodiments. In this embodiment, a turret motor 502A located within a turret 503A at the top of the quick-change turret, in combination with a pneumatic actuator 504A, may provide rotational motion to the quick-change turret. Each barrel 510A may contain a printable material 508A to be expelled via a needle, although any suitable type of delivery opening may be utilized to expel printable material 508A from the barrel 510A.

Turning now to FIG. 5B, a frontal view of a closed quick-change turret utilizing latches and with alignment pins in positioned up is shown according to various embodiments.

Turning now to FIG. 5C, a cross-sectional side view of a closed quick-change turret utilizing latches and with alignment pins positioned up is shown according to various embodiments. Any number of alignment pins 506C may be utilized to align one of a plurality of barrels have needles 512C with a pneumatic seal 514C. In various embodiments, any number of pneumatic seals 514C may be utilized, along with any number of corresponding barrels. In this embodiment, the needle 512C may provide printable material 508C due to the quick-change turret being closed. In this embodiment a pneumatic seal 514C may be configured to deliver a selected printable material 508C from within a barrel among the plurality of barrels. The pneumatic actuator 504C may be configured to extend the quick-change turret such that the pneumatic seal 514C varies between an open state and a closed state. The closed of the state quick-change turret may induce the pneumatic seal 514C by allowing the applied pressure to displace the printable material 508C in the barrel and pushing it out of the needle 512C tip.

Turning now to FIG. 6A, a side view of a quick-change turret in an open state utilizing latches and with alignment pins in a down position is shown according to various embodiments. Here the turret motor 602A may be located within a turret 603A at the top of the quick-change turret, in combination with a pneumatic actuator 604A. In this embodiment, the turret motor 602A may be configured to move an indexed motor spindle 607A. In this embodiment, the indexed motor spindle 307 may be configured to rotate the quick-change turret and a plurality of barrels 610A which may contain printable material 608A. In this embodiment, one or more latches 618A may secure or allow removal of the turret carriage assembly 616A. In embodiments, securing or removing a quick-change turret may be accomplished by moving or modifying a latch 618A when the quick-change turret is open, such as here. Any suitable number of latches 618A may be utilized to secure or allow removal of a turret carriage assembly 616A in various embodiments.

Turning now to FIG. 6B, a frontal view of a quick-change turret in an open state utilizing latches and with alignment pins in a down position is shown according to various embodiments.

Turning now to FIG. 6C, a cross-sectional side view of a quick-change turret in an open state utilizing latches and with alignment pins in a down position is shown according to various embodiments. In this example a barrel 610A has been aligned with the pneumatic seal 614C, which is open. In this embodiment, the quick-change turret is in an open state, which prevents printing.

Figure 7:
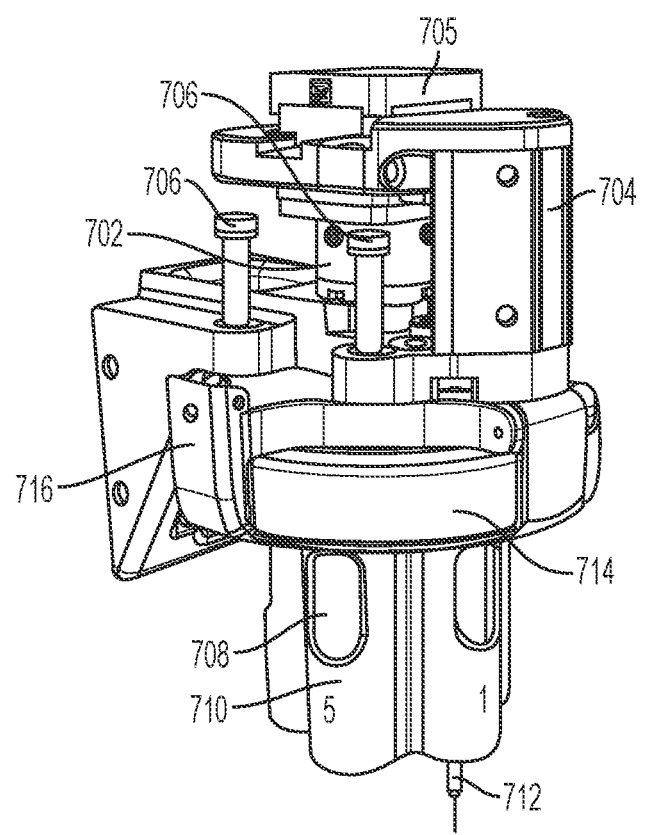
FIG. 7 illustrates a perspective view of a quick-change turret, according to one or more embodiments shown and described herein.

Turning now to FIG. 7, a perspective view of a closed quick-change turret is shown according to various embodiments. In this embodiment, the turret motor 702 may be located at the top of the quick-change turret, adjacent to the pneumatic actuator 704. In this example the alignment pins 706 are in the up position. A plurality of barrels 710 containing printable material 708 with a needle 712 are shown attached under the turret carriage assembly 714, which may be secured via one or more latches 707.

Figure 8:
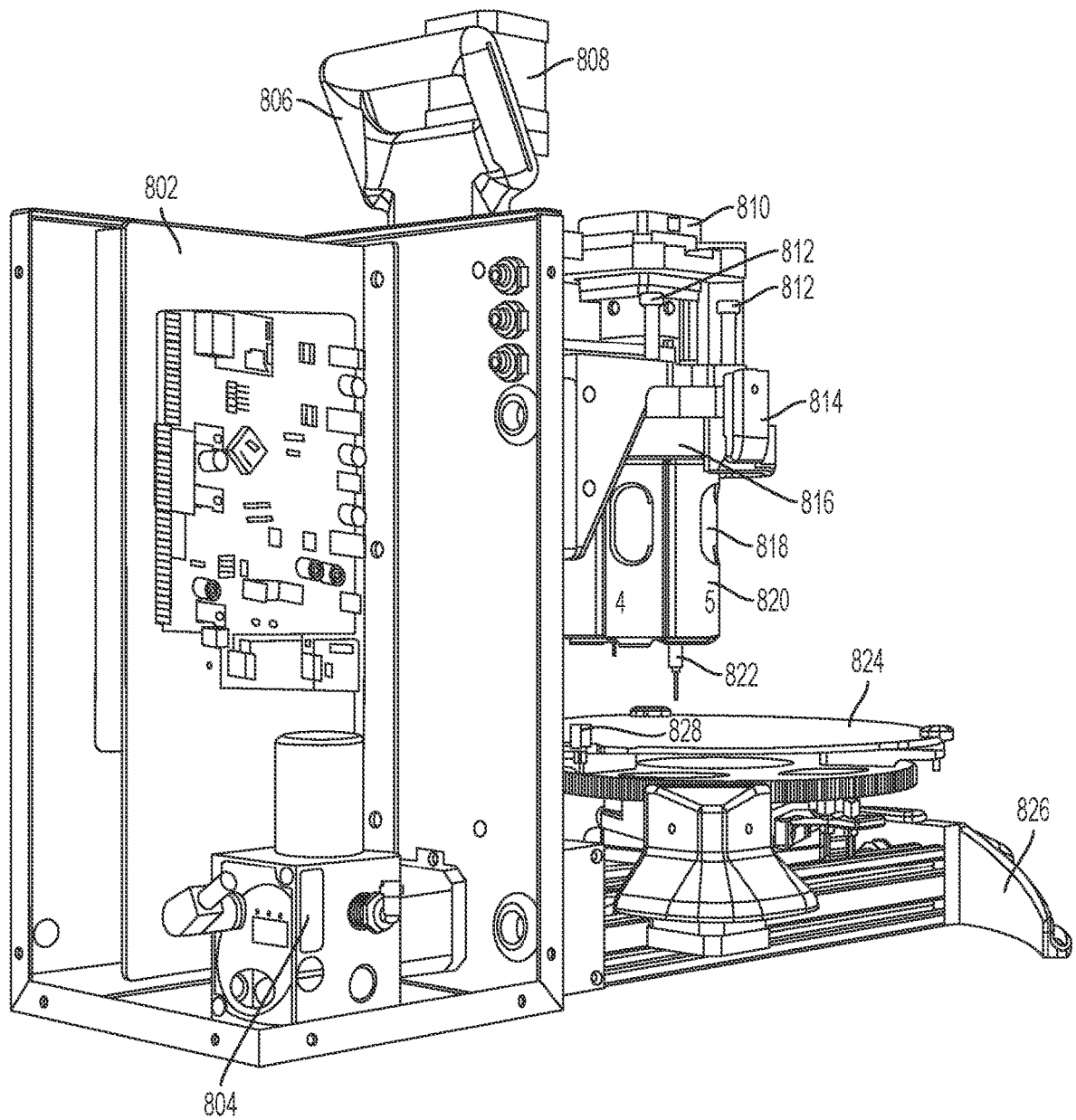
FIG. 8 illustrates a perspective view of an enclosure utilizing a pneumatic proportional regulator valve, according to one or more embodiments shown and described herein.

Turning now to FIG. 8, a perspective view of an enclosure utilizing a pneumatic proportional regulator valve is shown according to various embodiments. An enclosure 802 may be utilized to house various components described above, such as the power supply. In some embodiments an enclosure 802 may improve serviceability, improve the manufacturability, and provide cable refactoring. A pneumatic proportional regulator valve 804 may be configured to dynamically control pressure to a material barrel wherein the pressure is programmatically and dynamically adjusted during printing, and wherein properties of the printable material affect an amount of the pressure to print the printable material. In this embodiment, the pneumatic proportional regulator valve 804 is located within the enclosure 802, whereas it may be located outside of the enclosure 802 in other embodiments, or may be utilized as its own attached component regardless of whether there is an enclosure 802.

In some embodiments, a hand-grippable handle 806 may provide portability for a hand to be able to pick up the robotic fabrication and assembly platform by the handle and carry it. In various embodiments the handle 806 may be directly attached to the robotic fabrication and assembly platform. In this example the handle is located adjacent to the vertical motor assembly 808. Alignment pins 812 are shown here in an up position with the quick-change turret in a closed state. One or more barrels 820 that may contain a printable material 818 to be expelled via a needle 822. In embodiments, securing or removing the turret carriage assembly 816 may be accomplished by using one or more latches 814. Below the needle 822 in this example is the rotatable build platen 824. A front stabilizer 826 may be utilized to provide stability, such as tip-over prevention, to the robotic fabrication and assembly platform.

Figure 9:
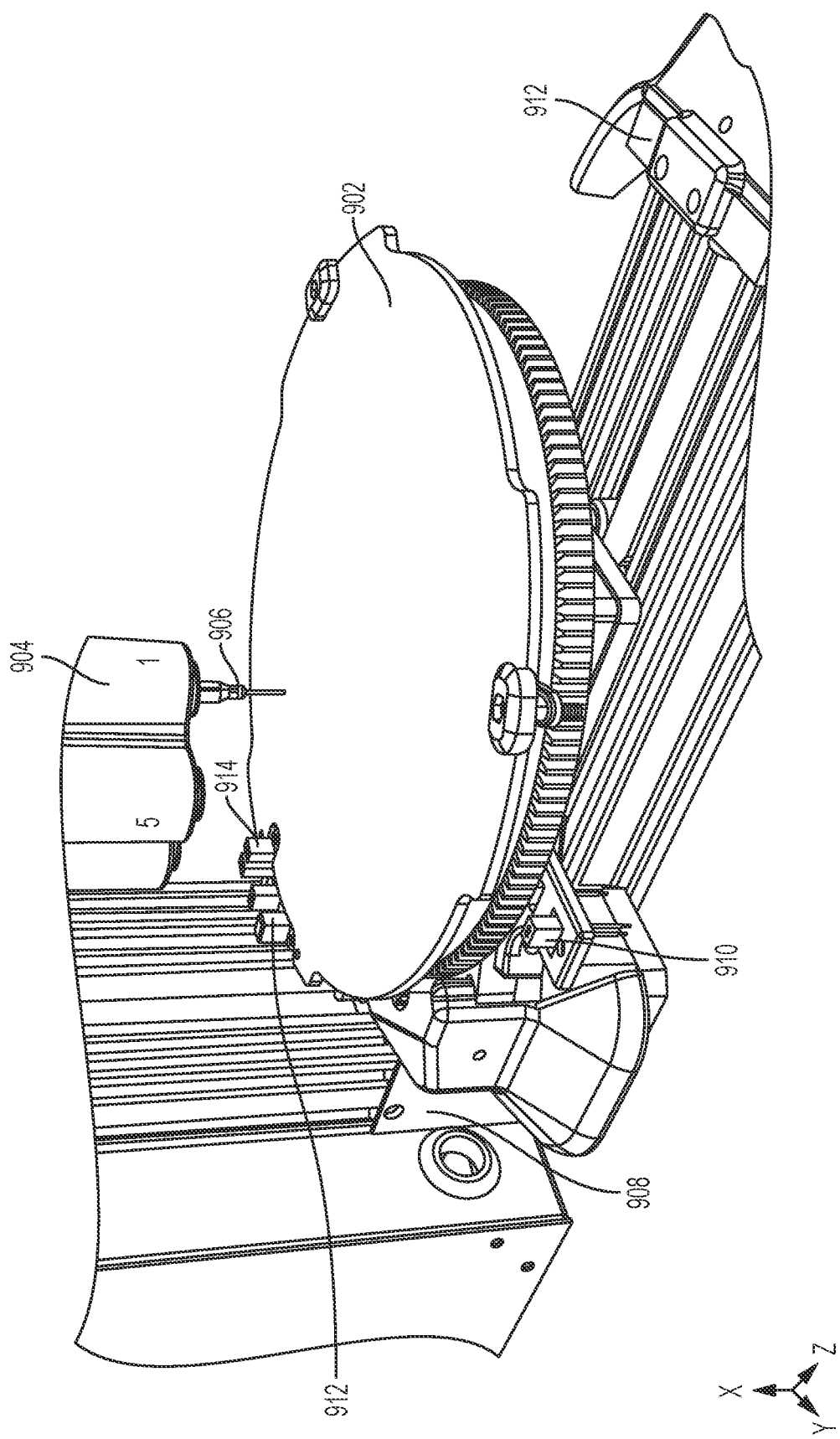
FIG. 9 illustrates a perspective view of a rotatable build platen featuring a theta sensor, according to one or more embodiments shown and described herein.

Turning now to FIG. 9, a perspective view of a rotatable build platen 902 featuring a theta sensor 910 is shown according to various embodiments. In this embodiment, a barrel 904 (along with other barrels depicted) has a needle 906 to deposit printable material upon the rotatable build platen 902, the rotation of which may be controlled by the angular motor assembly 908. In some embodiments, a theta home position of the rotatable build platen 902 may be determined according to a Θ value as detected by the theta sensor 910. Any number of theta sensors 910 may be utilized. In this embodiment the theta sensor 910 may be used for homing of the theta axis. Some embodiments may utilize a hall effect or magnetic noncontact sensor, whereby a magnet may be attached to a stage (or rotatable build platen 902) at one fixed position and the theta sensor 910 detects that location and sets it as the home position. In various embodiments an optical switch may utilize a thin beam of infrared light and a tab is attached to the stage (or rotatable build platen 902), such that when there is rotation, the tab crosses the beam. That location may be set as the home position.

Figure 10:
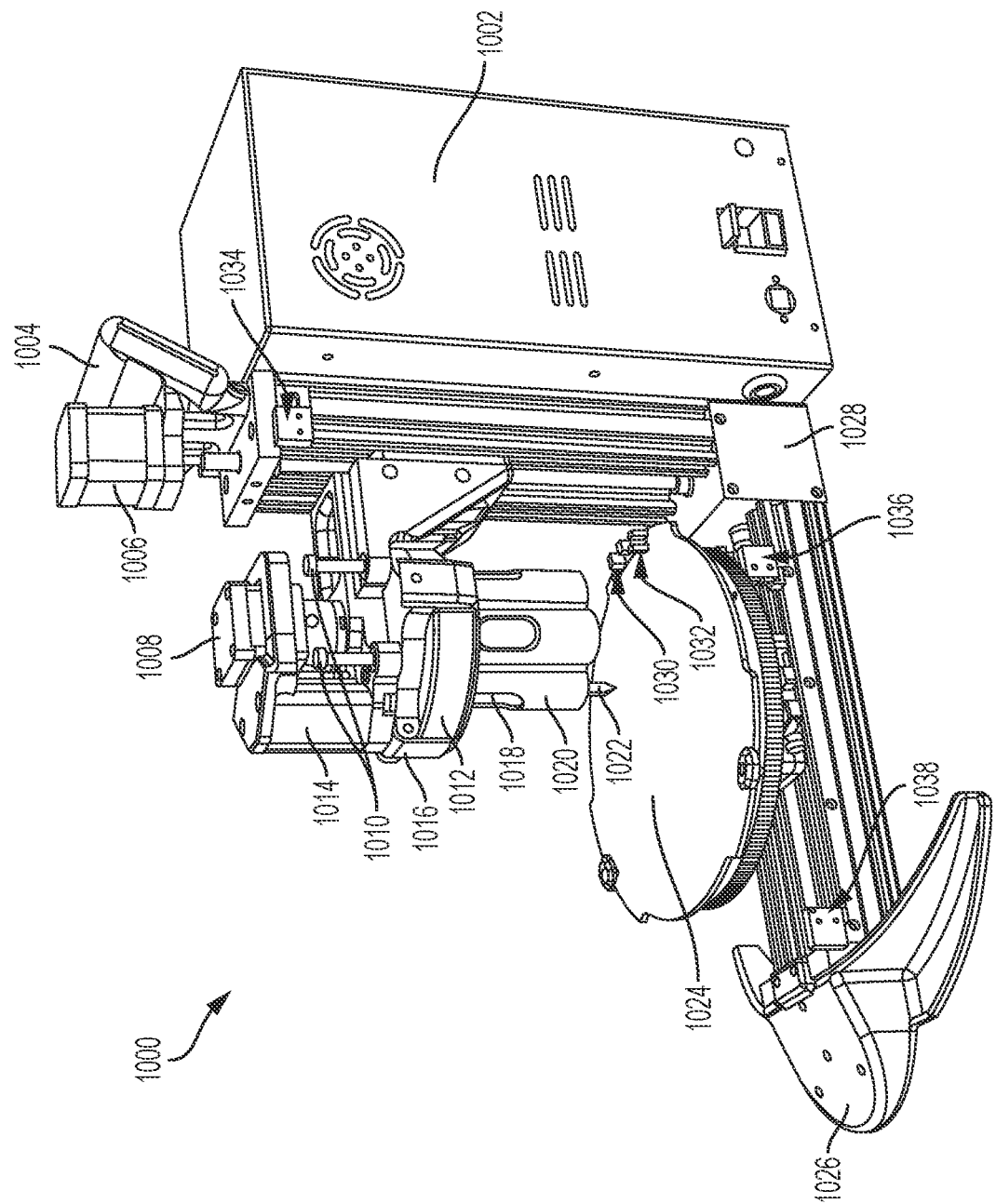
FIG. 10 illustrates a perspective view of a robotic fabrication and assembly platform featuring a Z-max limit switch, an R-min limit switch, and an R-max limit switch, according to one or more embodiments shown and described herein.

Turning now to FIG. 10, a perspective view of a robotic fabrication and assembly platform featuring a Z-max limit switch, an R-min limit switch, and an R-max limit switch is shown according to various embodiments. In this embodiment, an enclosure 1002 may be coupled to a handle 1004, a vertical motor assembly 1006, and a horizontal motor assembly 1028. As discussed above, a quick-change turret may include a turret 1008, alignment pins 1010, a turret carriage assembly 1012, a pneumatic actuator 1014, clamps 1016, and barrels 1020 containing one or more printable materials 1018 and one or more needles 1022. A front stabilizer 1026 may have an R-max limit switch 1038 attached or located nearby, and an R-min limit switch 1036 may be located near the horizontal motor assembly 1028. An R-axis and Z-axis sensor for tip calibration 1030 and/or a Θ-axis sensor for tip calibration 1032 may be attached or located on or near the rotatable build platen 1024. The vertical motor assembly 1006 may have a Z-max limit switch 1034 coupled to it or located in close proximity. In various embodiments the R-axis and z-axis sensor for tip calibration 1030, the Θ axis sensor for tip calibration 1032, the Z-max limit switch 1034, the R-min limit switch 1036, and/or the R-max limit switch 1038 may be located in any suitable location on the a robotic fabrication and assembly platform or omitted. The switches, which may be infrared (or utilize any other suitable detection mechanism), may be utilized to implement a non-contact tip detect system to calibrate the tip of each needle 1022 to the coordinate system. In this embodiment there are two optical switches (although any suitable number may be utilized in other embodiments), one switch 1030 to measure tip in the R direction and the other switch 1032 to measure the tip in the theta direction. The R direction sensor may also be utilized to calibrate the end of the needle 1022 tip in the Z direction. In some embodiments this may include performing axis endstop switch calibration, determining a needle 1022 tip location in a horizontal direction, determining the needle 1022 tip location in a vertical direction, and determining the needle 1022 tip location in an angular direction.

Figure 11:
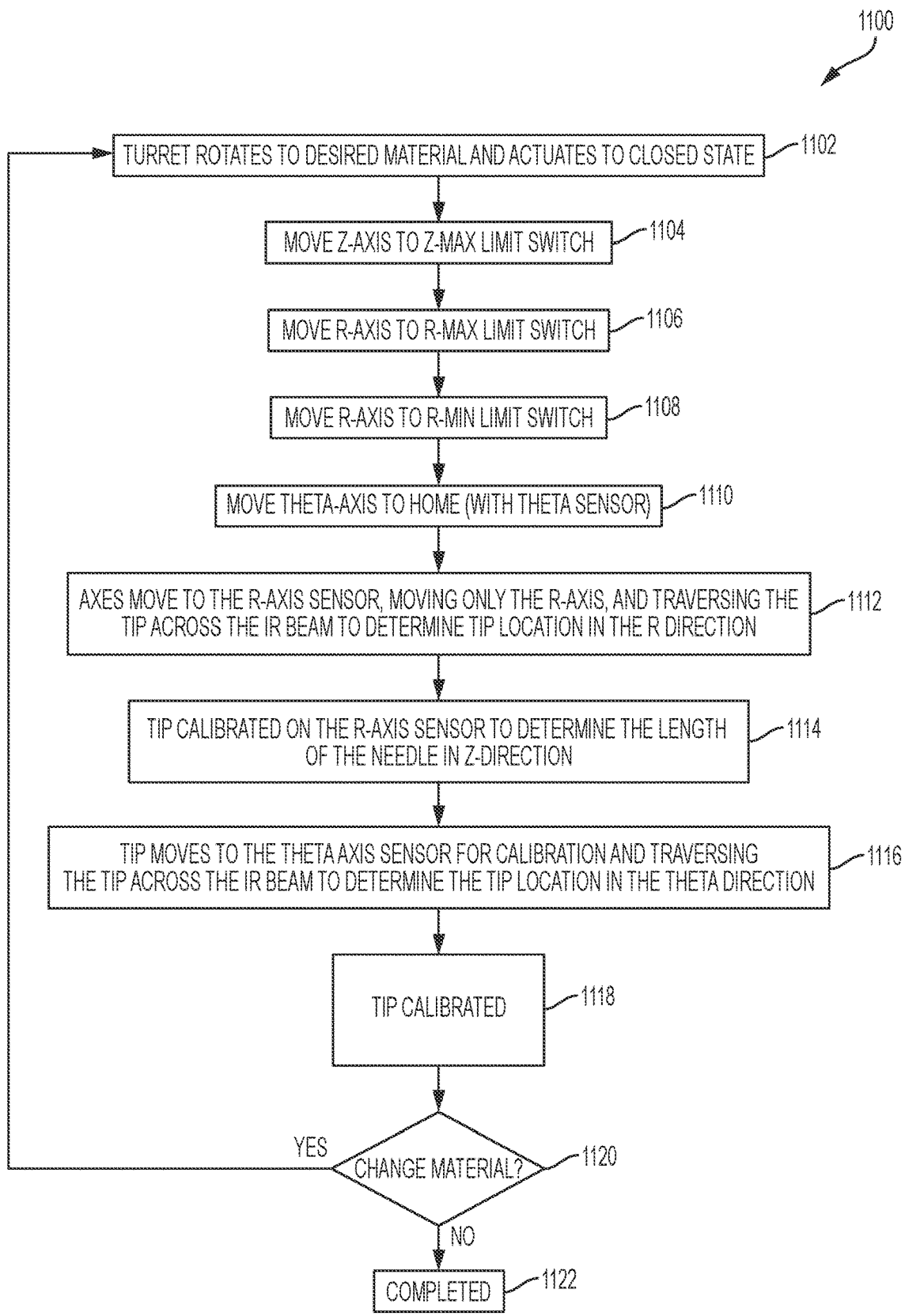
FIG. 11 depicts a flowchart illustrating a methodology for tip calibration, according to one or more embodiments shown and described herein.

Turning now to FIG. 11, a flowchart 1100 for fabricating a three-dimensional object by using a turret for swapping barrels of printable materials is shown according to various embodiments. At 1102, the turret rotates to a desired material and actuates to a closed state. At 1104, axis endstop switch calibration may begin, whereby the z-axis may move to a Z-max limit switch. At 1106, the r-axis may move to an r-max limit switch. At 1108, the R-axis may move to an R-min limit switch. At 1110, the theta-axis may move home with the theta sensor. At 1112, the axis endstop switch calibration may complete, so that axes move to the R-Axis sensor, moving only the R-axis, and traversing the tip across the IR beam to determine tip location in the R direction. At 1114, the tip may be calibrated on the R-Axis sensor to determine the length of the needle in the Z-Direction. At 1116, the tip may move to the theta axis sensor for calibration and traverse the tip across the IR beam to determine the tip location in the theta direction. At 1118, the tip may be in a calibrated state ready to print material within that particular barrel. At 1120, a determination may be made as to whether the printable material is to be changed. If so, the process may return to 1102 to begin tip calibration again. Otherwise, the process may finish at 1124.

Figure 12:
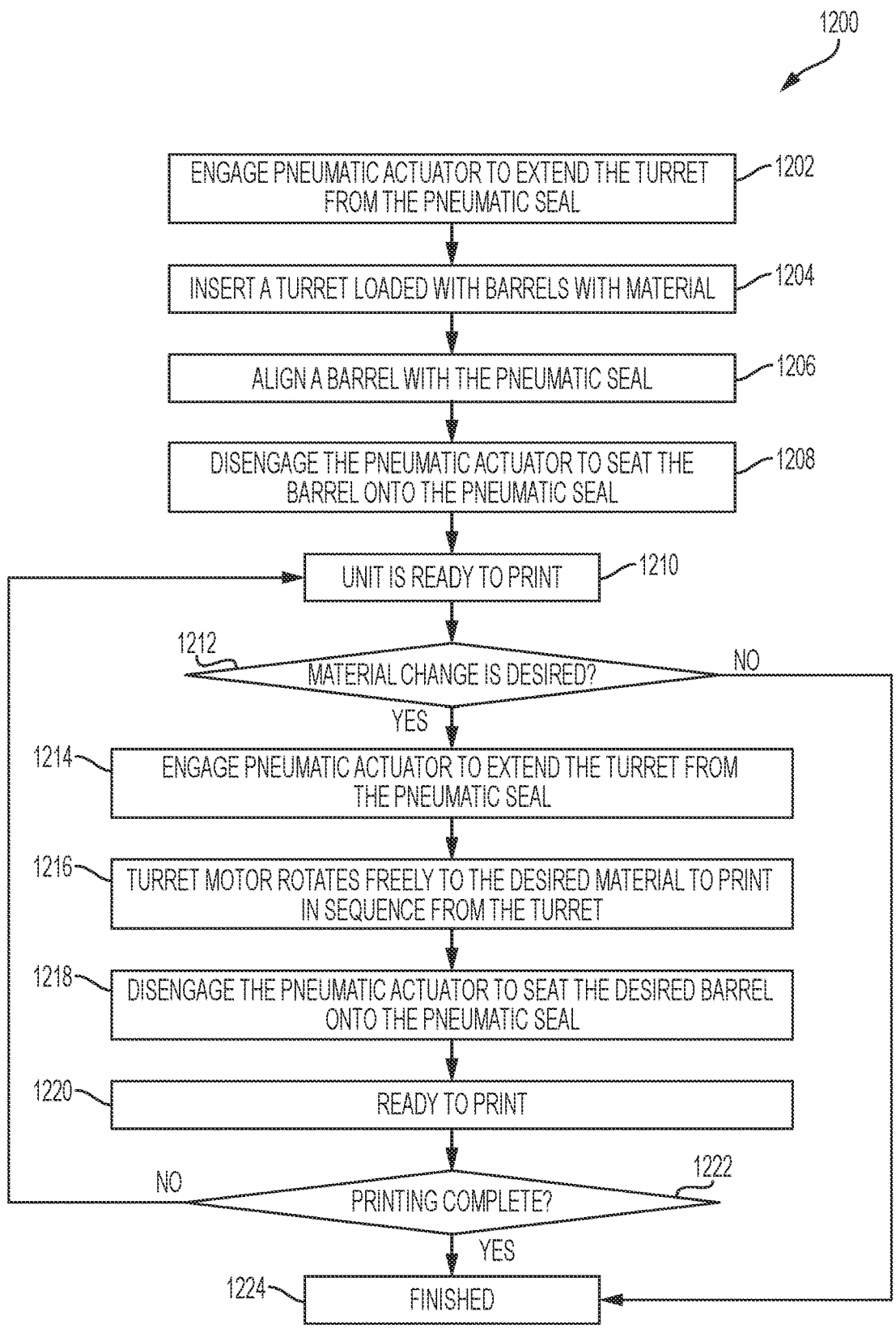
FIG. 12 depicts a flowchart illustrating a methodology for fabricating an object by using a turret for swapping barrels of printable materials, according to one or more embodiments shown and described herein.

Turning now to FIG. 12, a flowchart 1200 for fabricating a three-dimensional object by using a turret for swapping barrels of printable materials is shown according to various embodiments. At 1202, the pneumatic actuator may be engaged to extend the turret from the pneumatic seal. At 1204, a turret loaded with barrels containing one or more printable materials may be inserted. At 1206, one of the barrels may be aligned with the pneumatic seal. At 1208, the pneumatic actuator may be disengaged in order to seat the barrel onto the pneumatic seal. At 1210, the unit may then be ready to print. At 1212, a determination may be made as to whether a change in printable material is desired, needed, and/or instructed. If not, the process may proceed to finish at 1224. Otherwise, at 1214, the pneumatic actuator may be engaged in order to extend the turret from the pneumatic seal. At 1216, the turret motor may then rotate freely to the desired/requested/instructed material to print in sequence from the turret. At 1218, the pneumatic actuator may be disengaged in order to seat the next/desired/specified barrel onto the pneumatic seal. In some embodiments, this may be based upon another printable material being needed or more of the same printable material being needed from another barrel. At 1220, the unit may again be ready to print. At

1222, a determination may be made as to whether the printing is complete. If not, the process may return to 1210 with the unit again being ready to print. Otherwise, if the printing is complete, then the process may finish at 1224.

Figure 13:
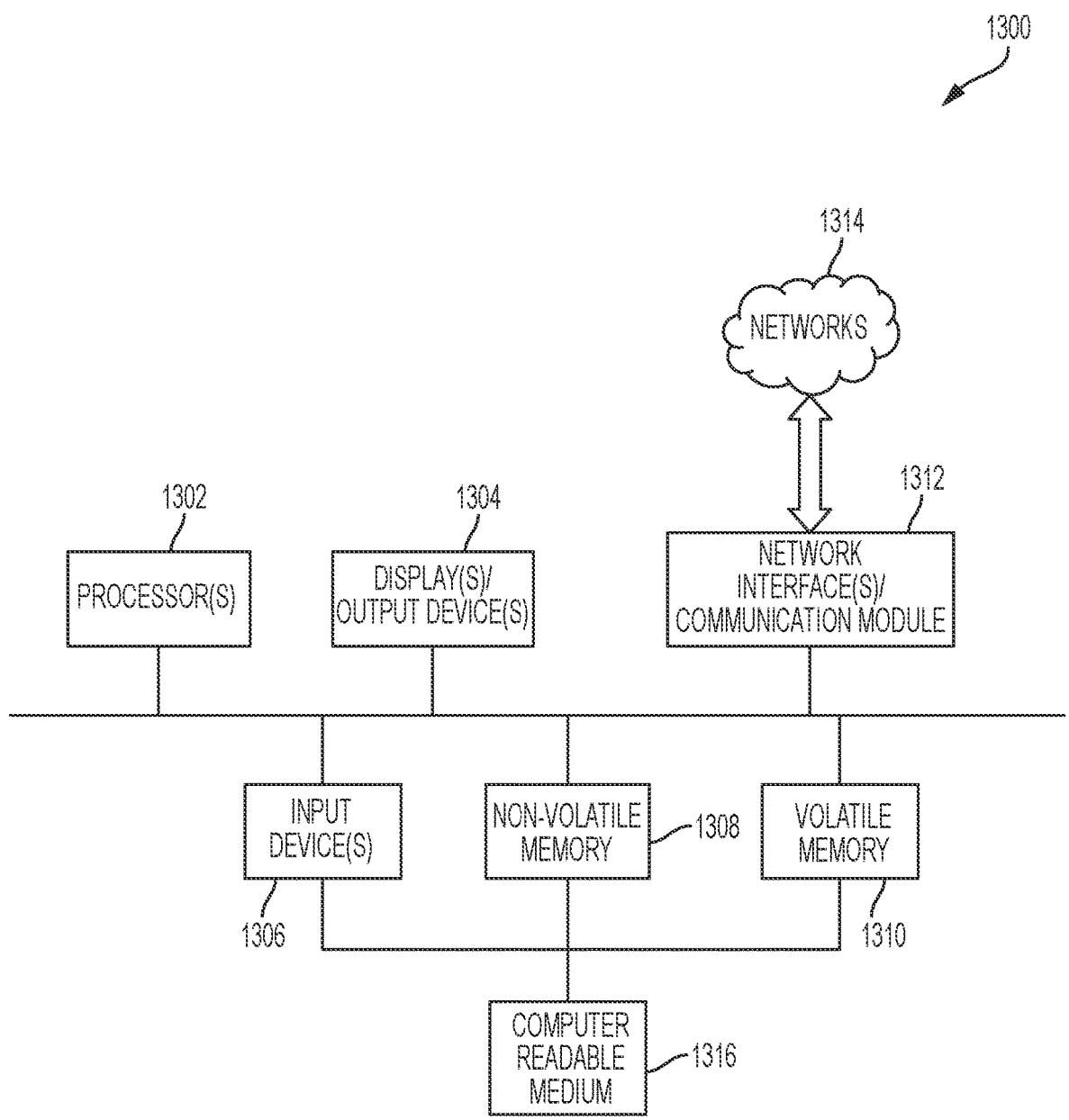
FIG. 13 schematically illustrates exemplary computing hardware for implementing various processes and systems, according to one or more embodiments shown and described herein.

Turning now to FIG. 13, a block diagram illustrates an example of a computing device 1300, through which embodiments of the disclosure can be implemented. The computing device 1300 described herein is but one example of a suitable computing device and does not suggest any limitation on the scope of any embodiments presented. Nothing illustrated or described with respect to the computing device 1300 should be interpreted as being required or as creating any type of dependency with respect to any element or plurality of elements. In various embodiments, a computing device 1300 may include, but need not be limited to, a desktop, laptop, server, client, tablet, smartphone, or any other type of device that can compress data. In an embodiment, the computing device 1300 includes at least one processor 1302 and memory (non-volatile memory 1308 and/or volatile memory 1310. The computing device 1300 can include one or more displays and/or output devices 1304 such as monitors, speakers, headphones, projectors, wearable-displays, holographic displays, and/or printers, for example. The computing device 1300 may further include one or more input devices 1306 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 1300 may include non-volatile memory 1308 (ROM, flash memory, etc.), volatile memory 1310 (RAM, etc.), or a combination thereof. A network interface 1312 can facilitate communications over a network 1314 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 1312 can be communicatively coupled to any device capable of transmitting and/or receiving data via the network 1314. Accordingly, the hardware of the network interface 1312 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 1316 may comprise a plurality of computer readable mediums, each of which may be either a computer readable storage medium or a computer readable signal medium. A computer readable storage medium 1316 may reside, for example, within an input device 1306, non-volatile memory 1308, volatile memory 1310, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 1300 may include one or more network interfaces 1312 to facilitate communication with one or more remote devices, which may include, for example, client and/or server devices. A network interface 1312 may also be described as a communications module, as these terms may be used interchangeably.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for providing a plurality of printable materials to a robotic fabrication and assembly platform for fabrication of an object, comprising:

engaging a pneumatic actuator to extend a quick-change turret from a pneumatic seal;

inserting a plurality of barrels into the quick-change turret;
aligning one of the plurality of barrels with a pneumatic seal in the quick-change turret;
disengaging the pneumatic actuator to seat the aligned barrel onto the pneumatic seal;
printing a three-dimensional object;
halting the printing of the three-dimensional object prior to completion;
engaging the pneumatic actuator to extend the quick-change turret from the pneumatic seal;
selecting another printable material from the plurality of printable materials by rotating the quick-change turret via a turret motor to print in sequence another printable material of the plurality of printable materials;
disengaging the pneumatic actuator to seat another of the plurality of barrels onto the pneumatic seal; and
resuming printing of the three-dimensional object.

2. The method of claim 1 further comprising carrying robotic fabrication and assembly platform by a handle directly attached to the robotic fabrication and assembly platform.

3. The method of claim 1 further comprising securing or removing the quick-change turret by moving or modifying a latch.

4. The method of claim 1 further comprising changing a barrel stroke size to accommodate a different well plate size.

5. The method of claim 1 wherein printing the three-dimensional object further comprises bio-printing a three-dimensional object.

6. The method of claim 1 further comprising:
printing the three-dimensional object according to cylindrical coordinate values comprising RΘZ, wherein R represents a horizontal coordinate value, Θ represents a rotational axis coordinate value, and Z represents a vertical coordinate value.

7. The method of claim 6 further comprising:
determining a theta home position according to a Θ value detected by a theta sensor.

8. The method of claim 1 further comprising sequentially aligning a plurality of barrels with the pneumatic seal, wherein at least two of the plurality of the barrels each contain a different printable material.

9. The method of claim 1 further comprising:
performing axis endstop switch calibration;
determining a needle tip location in a horizontal direction;
determining the needle tip location in a vertical direction; and
determining the needle tip location in an angular direction.

10. The method of claim 1 further comprising:
providing heating or cooling via the quick-change turret.

11. The method of claim 1 further comprising a fused deposition modeling head that is either an additional print head within the quick-change turret or next to the quick-change turret.

12. The method of claim 1 further comprising:
providing, via a hand-grippable handle, portability for a hand to pick up the robotic fabrication and assembly platform by the handle.

13. The method of claim 1 further comprising:
reducing air turbulence by providing a path for unobstructed airflow from a height above the robotic fabrication and assembly platform onto a rotatable build platen.

14. The method of claim 1 further comprising:
dynamically controlling pressure to a material barrel via a proportional regulator valve; and
programmatically and dynamically adjusting the pressure during printing, wherein properties of at least one of the printable materials affect an amount of the pressure to print the at least one of the printable materials.

15. The method of claim 1 further comprising:
determining, via a theta sensor, a rotational starting position of the rotatable build platen.

16. The method of claim 1 further comprising:
changing, via the quick-change turret, between printable materials without programmatically compensating for static spans between needle tips on the plurality of barrels on the print head.

* * * * *